United States Patent Office 3,431,380
Patented Mar. 4, 1969

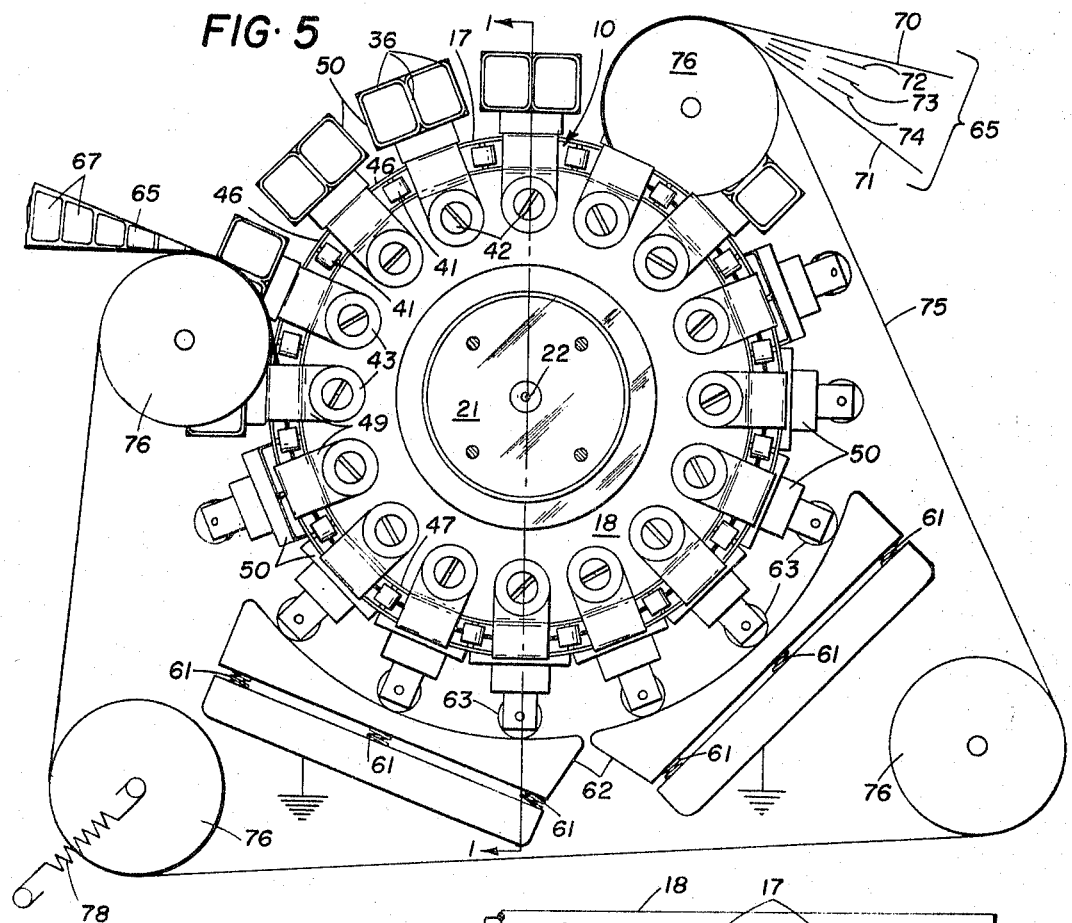
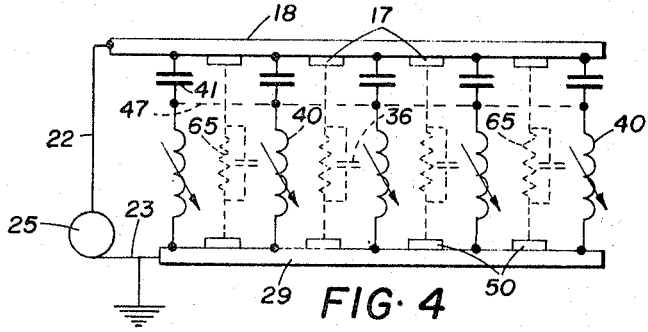
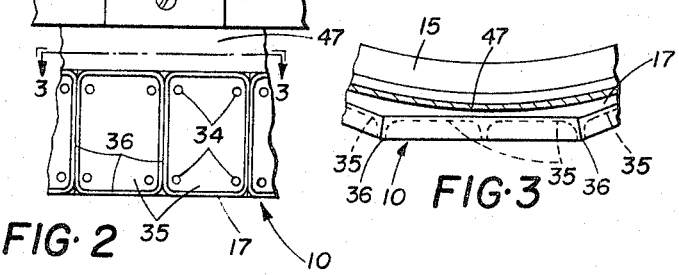
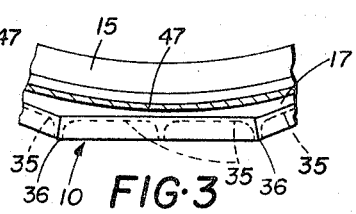
PAUL A. BURGO
ERNEST J. BUTLER
CHARLES W. PIERSON
ROBERT C. SUTLIFF
INVENTORS
ATTORNEYS One of these electrode systems is grounded and the other is energized with a high frequency potential. Thus, the plastic, forming the packaging being heated for sealing purposes, acts as a dielectric in a high frequency tuned circuit. As will become apparent from the following discussion, the wheel has mounted thereon a plurality of capacitors and a number of inductive elements associated with the package forming stations along the periphery of the wheel. Thus the combination of inductive elements and package forming stations comprise tuned circuits which rotate with the wheel. Moreover, each inductive element is tunable so as to provide a maximum energy transfer across the plastic materials being dielectrically heated at each station.

3,431,380
DIELECTRIC PACKAGE SEALER
Robert C. Sutliff, Paul A. Burgo, Ernest J. Butler, and Charles W. Pierson, Rochester, N.Y., assignors to Eastman Kodak Company, Rochester, N.Y., a corporation of New Jersey
Filed July 5, 1966, Ser. No. 562,799
U.S. Cl. 219—10.53        11 Claims
Int. Cl. B23k 13/02; H05b 5/00

ABSTRACT OF THE DISCLOSURE

A dielectric package sealer which continuously forms packages from plastic webs. The webs are positioned between opposite package-forming cup rims which comprise the two electrodes of a high frequency alternating current circuit. When the cup rims are aligned with the web compressed therebetween, the circuit is energized. The webs, being dielectrics, are heat sealed together forming a container.

---

The present invention relates to a dielectric package sealer and more particularly to a continual high frequency heating apparatus for sealing together the periphery of contiguous forms in two plastic webs to form a series of packages.

In the art of packaging, numerous devices have been developed to package various perishable or easily damaged items. One of the more recent packaging techniques involves the use of high frequency dielectric heating. This heating is accomplished by placing a relatively high dielectric plastic within an electric field. The heating is due to the electrical loss characteristics of the plastic when subjected to a very high frequency alternating current field. The electrical loss causes the plastic to heat internally and uniformly in the region of energy application. Thus, by use of such internal heating, the plastic surfaces will not become tacky and stick to adjacent components, such as the high frequency electrodes. On the other hand, a plastic being heated by a hot shoe or the like often does tend to melt and deposit melted plastic on the heating surface. Although the provision of a non-adhering coating, such as aluminum, on the outer surface of the webbing will overcome this specific problem, it also adds a stiffness as well as adding considerably to the cost of the package.

Although dielectric heating has certain advantages, there are several intriguing problems in connection with placing dielectric sealing electrodes adjacent to the plastic material to be heated, especially when using these electrodes in a continuous flow packaging process. For instance, the electrodes must be placed in such a manner that one may be energized by a high frequency power generator and the other electrode connected to the generator ground terminal. The prior art indicates that to continuously heat a moving web by use of practical levels of high frequency power has not been fully perfected.

Therefore, an object of the present invention is to provide a new and improved high frequency package sealer.

In accordance with one embodiment of our invention, one electrode system of a high speed, high frequency dielectric heating apparatus comprises a wheel's peripheral surface with the surface formed to provide a plurality of package forming stations. A cooperating electrode system comprises a series of caps coupled to the wheel to mate selectively with each of the surface package forming stations. Both the wheel surface and each cap define a flange or cup rim corresponding to the perimeter of the package to be formed. One of these electrode systems is grounded and the other is energized with a high frequency potential. Thus, the plastic, forming the packaging being heated for sealing purposes, acts as a dielectric in a high frequency tuned circuit. As will become apparent from the following discussion, the wheel has mounted thereon a plurality of capacitors and a number of inductive elements associated with the package forming stations along the periphery of the wheel. Thus the combination of inductive elements and package forming stations comprise tuned circuits which rotate with the wheel. Moreover, each inductive element is tunable so as to provide a maximum energy transfer across the plastic materials being dielectrically heated at each station.

The subject matter which is regarded as our invention is particularly pointed out and distinctly claimed in the concluding portion of this specification. The invention, however, as to its organization and operation, together with further objects and advantages, will best be understood by reference to the following description taken in connection with the accompanying drawings, in which:

FIG. 2 is a partial top plan view of the wheel shown in FIG. 1;

FIG. 3 is a sectional view taken along the line 3—3 of FIG. 2;

FIG. 4 is a simplified schematic diagram of the electronic elements of the wheel shown in FIG. 1; and FIG. 5 is a simplified elevation view of the wheel illustrated in FIG. 1.

Figure 1:
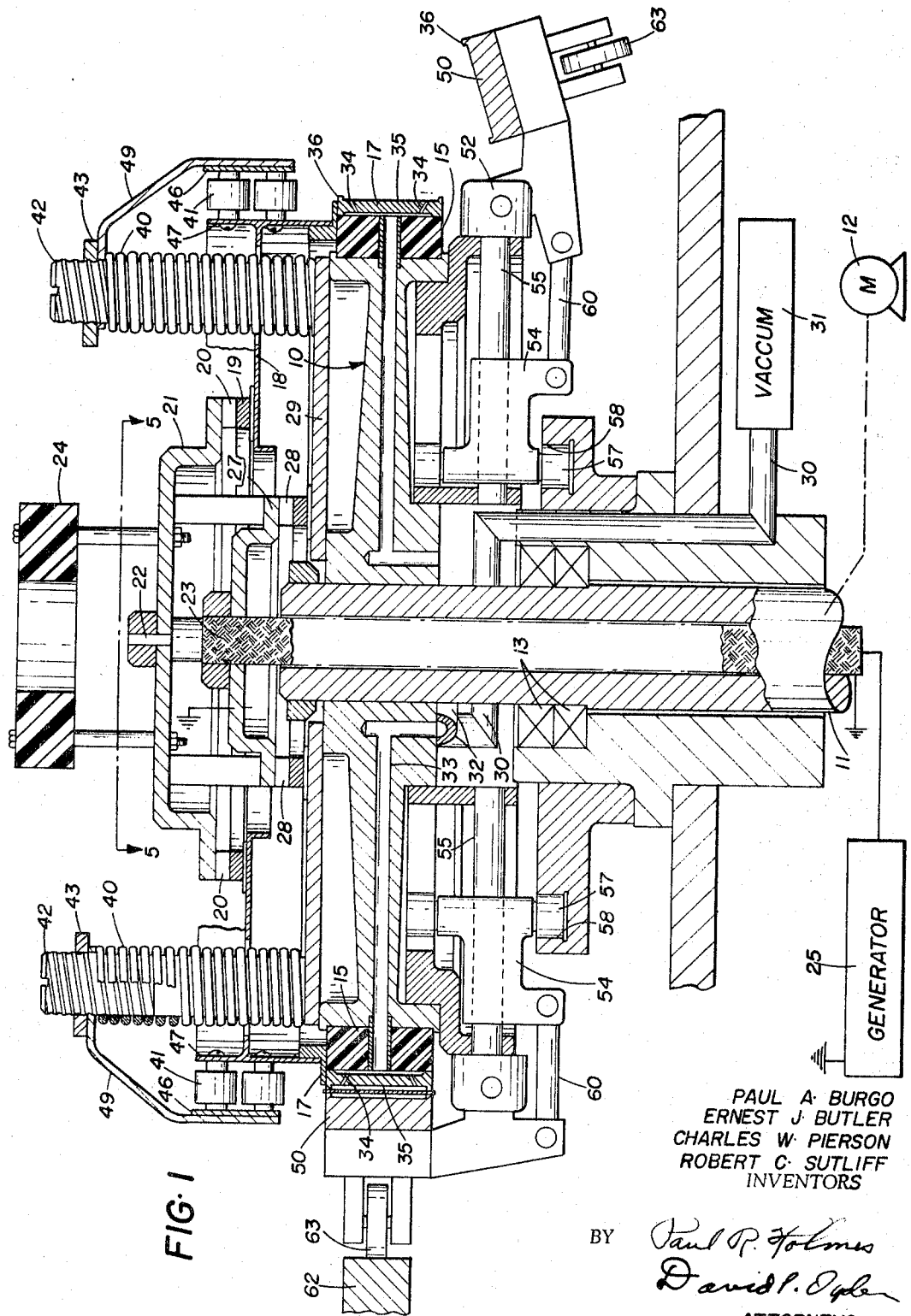
FIG. 1 is a simplified sectional view taken along the axis of the sealing wheel of our invention and indicated at 1—1 of FIG. 5.

Referring now to the drawings, wherein like numbers indicate similar parts, in the sectional view of FIG. 1 we have shown a wheel 10 which is mounted on a hollow rotatable shaft 11 to be driven at a constant speed by a motor 12. The shaft 11 is journaled in bearings 13. Around the periphery of the wheel 10 is located a high-strength, high-density insulator 15 made of a material such as certain mica compounds. Secured on the outer surface of the insulator 15 is a hoop-like rim which forms one high-frequency electrode 17 of the dielectric sealing apparatus. As will become apparent from the following discussion, the rim electrode 17 is the "hot" or high voltage electrode of the dielectric system to be described and is formed with outward facing packaging forming stations which mate selectively with electrically grounded "cap" electrodes.

The electrode 17 is energized from a high voltage plate 18 secured to the wheel 10 to rotate therewith. The plate 18 is electrically coupled through a slip ring 19 and brushes 20 to a nonrotatable plate 21. The plate 21 is energized from a "hot" line 22 of a coaxial cable 23 and is bolted to a rigid insulating support block 24. The energized line 22 receives its high frequency electrical power from a generator 25. In one particular embodiment of our invention, we prefer that the energization be at a frequency of about 30 megacycles and that the RMS voltage be of the order of 2,000 volts. It should be noted that the coaxial cable 23 passes through the hollow center of the shaft 11 whereby it does not rotate therewith.

The grounded outer cover of the coaxial cable 23 is secured to a nonrotatable plate 27 which is mounted on, but not electrically coupled to, the plate 21. Electrically the grounded sheath of the cable 23 is coupled by a slip-ring and brush assembly 28 to ground a plate 29 which is electrically coupled to and mounted to rotate with a central portion of the rotatable wheel 10. Thus this portion of the wheel 10 is coupled to the grounded side of the generator 25.

Referring for a moment to the physical structure itself, it will become apparent from the following discussion that the closing and compressing of the materials during the sealing step, as well as the heating thereof, will tend to cause a substantial fluid (air) pressure buildup within the package forming stations. Therefore, it is essential to provide pressure relief during the welding cycle. To allow such pressure relief, a vacuum line 30 couples a vacuum source 31 through the nozzle 32 to holes 33 bored in the wheel 10 and each connected to one of the rim electrode stations. The rim electrode 17 is perforated at each station by apertures 34 so that the materials being sealed together may be partially compressed into these evacuated cups.

Referring briefly to FIG. 2, a pair of dished-out portions or cups 35 in the rim electrode 17 are illustrated in plan view and show several of the vacuum apertures 34 positioned near the four corners of the cup rims 36. The pair of cups 35 is what is referred to herein as a "package forming station."

In FIG. 1 are also illustrated further electronic components in the form of tuning inductors 40 and capacitors 41 electrically connected in series between the plates 18 and 29 and physically mounted to rotate therewith. The inductors 40 are tunable to movement of a slotted plug 42 in each inductor whereby each may be positioned to provide maximum power to each pair of cups 35. The plugs 42 are externally threaded to be selectively positioned through a lock washer 43. As shown in FIGS. 1 and 2, each pair of cups 35 (each station) is coupled to the "hot" plate 18 by a peripheral hoop or flange 47. Also each of the capacitors 41 is secured between a pair of hoops 46 and 47. Additionally, the hoop 47 forms a peripheral flange on the "hot" plate 18. Linking straps 49 secure the capacitive hoop 46 to the coil 40 and support the tuning lug 42 and lock washer 43. Thus, the physical placing of the primary electronic components is on the wheel 10 to rotate therewith.

Referring now to FIG. 3, a package forming station is illustrated as having a plane outer cup rim surface. Associated therewith a pair of cups 35 is partially indicated on each side thereof at a different angle whereby each station outlines a plane facit of the periphery of the wheel 10. The hoop 46 is coupled to each station.

Referring again to FIG. 1, the other "grounded" electrode of the high frequency system is indicated at 50 as a cap mounted on a pivot support 52 to rotate with the wheel 10. Each of the cap electrodes 50 is also provided with cup rims 36. When the caps are closed to clamp the web, these mating cup rims 36 form a proper capacitance for the tuned circuit and concentrate the dielectric energy in the package seal area. The support 52 also forms a part of a support of a cam drive assembly 54 for closing the cap electrodes 50. In order to press the electrodes 50 against the rim electrode 17, the cam drive assembly 54 is selectively raised and lowered radially on a shaft 55 as the wheel 10 rotates. The assembly 54 moves radially in accordance with the position of a cam system being driven by a cam follower 57 as it traverses a stationary and generally annular track 58. This raising and lowering of the assembly 54 on the shaft 55 drives the cap electrode 50 between open and closed positions by means of a coupling shaft 60. The cap electrodes 50, of course, are in the open position when the several webs are moved into position between the electrodes and when the sealed packages are being removed.

During the sealing operation, both the heating and the compressing steps, the caps (electrodes 50) are closed so that the cup rims 36 mate with a predetermined spacing. During at least the latter portion of the heating step, the mating cup rims 36 are forced tightly together by several high pressure springs 61 (FIG. 5) which bias a cam arrangement indicated at 62 toward the wheel 10. Thus, each of the electrodes 50 supports a second cam follower wheel 63 which sequentially engages the surface of the cam arrangement 62 during the high pressure closing of the electrodes 17 and 50. When in the closed position, the composite webbing 65 is heated and compressed to weld the plastic together. The compressive motion of the cup rims 36 is made sufficient to allow easy removal of each packet 67 formed thereby from the web 65. This change of spacing also changes the capacitance of the tuned circuit to increase its impedance and reduce its power acceptance. Thus the maximum heating occurs only in regions where the web is not yet soft and it is necessary to heat it.

Referring now to FIG. 4, the electronic circuit is indicated schematically with the grounded plate 29 being secured to the high frequency generator 25 by the grounded portion of the coaxial cable 23 and the high potential plate 18 being secured to the high frequency generator 25 by the central energized line 22 of the coaxial cable. The capacitors 41 are electrically positioned between the "hot" plate 18 and the conductive hoop 47 (indicated in phantom) for the purpose of blocking direct current flow through the inductors 40 which appear to D.C. as a short circuit. This is necessary to prevent false "arc" detection indications. Therefore, capacitors 41 have negligible effect on the tuned circuit formed by the inductors 40 and the electrodes 17 and 50 which together with the webbing 65 form the capacitive load. However, the total capacitive and inductive reactance is carefully selected to attain a maximum power flow across the composite web 65 (shown in phantom as a plurality of resistors in FIG. 4 with the rims 36 being illustrated in phantom as capacitors).

Referring now to FIG. 5, the wheel 10 is illustrated in an elevation view as supporting the "hot" plate 18, the capacitors 41, the linking straps 49, the tuners 42 etc. Also illustrated is the composite web 65 comprising a top web 70, a bottom web 71 and packets of filling material including several layer elements 72, 73 and 74. These elements 72–74 fit within the area defined by the mating cup rims 36 of the cups 35 and the caps 50 so that they are not compressed or heated during the package forming process. In one particular packaging program of the present invention, the packet layer elements 72, 73 and 74 include a dental X-ray film sheet trimmed to size and prepared for utilization. Beneath the composite web 65 is a buffer belt 75 carried on pulleys 76 in a closed loop path and transporting the composite web 65 to the dielectric heater wheel 10. The buffer belt 75 is tensioned, as by a spring 78, to maintain the composite web 65 against the rim electrode 17 prior to the cap electrodes 50 being clamped thereover. Thus, the packet elements remain in their relative spacial position so that the X-ray film is not compressed between the mating cup rims 36 during the heating and welding of the packaging web layers 70 and 71.

While we have shown a particular embodiment of this invention, modifications thereof will occur to those skilled in this art. We intend therefore to have the appended claims cover such embodiments as properly fall within the scope of the present invention.

We claim:

1. An apparatus for dielectrically heating a plastic to form successive sealed containers from a pair of superposed plastic webs, comprising:
   a wheel having an outer rim electrode surface comprised of adjacent outwardly facing first cup rims;
   a plurality of other electrodes supported to rotate with said wheel and each having cup rim surfaces pivotable for cooperating with the first cup rims to clamp the webs therebetween and to provide a capacitive coupling therebetween, said coupling being a function of the distance between the mating cup rims;
   an inductor coupled in circuit with the mating cup rims;
   and a power source for supplying high frequency energy to the circuit, the circuit being tuned so that maximum energy is transferred to the web after the cup rims clamp the web and before the web is substantially compressed between the cup rims, such compression occurring only after the plastic is softened by heating.

2. An apparatus for dielectrically heating as defined in claim 1, wherein the entire tuned circuit rotates with said wheel and having means for tuning the circuit to reduce the reluctance thereof to a minimum when the cool plastic webs are tightly clamped between the mating cup rims.

3. An apparatus for dielectrically heating as defined in claim 1 including means operable on said other electrodes for developing substantial pressure for compressing the webs between the mating cup rims.

4. An apparatus for continually forming sealed containers from superposed plastic web layers comprising:
   a rotatable drive shaft;
   a wheel rim supported by said shaft but electrically insulated therefrom, said wheel rim having a plurality of radially outward extending first cup rims defining recesses on the outer periphery of said wheel rim;
   a plurality of support devices defining second cup rims peripherally disposed relative to said wheel rim and alignable with said first cup rims for receiving the plastic web layers therebetween and for mating engagement with such first cup rims during at least a portion of the rotation of said wheel rim;
   a plurality of inductor elements coupled to the mating cup rims to form a turnable circuit; and
   means for energizing the circuit during said portion of rotation of said wheel rim to dielectrically heat and seal together such plastic web layers between the mating cup rims.

5. An apparatus for forming a sealed container as in claim 4 including conduit means coupled to relieve fluid pressures within the volume defined by the mating cup rims during heating and compressing of the plastic web layers.

6. An apparatus as in claim 4 including means for tuning each of said inductor elements to attain maximum energy transfer between the mating cup rims.

7. An apparatus for forming a sealed container as in claim 4 including means coupled to said support devices for exerting pressure on the superposed webs during a period when the webs are heated so as to substantially compress the edges of each package formed thereby to facilitate its removal from the superposed webs.

8. An apparatus for dielectrically heating plastic webbing to continually form a succession of sealed containers from a pair of superposed plastic web layers, comprising:
   a wheel having an outer rim electrode of low impedance to electric current, said rim defining a plurality of radially outwardly facing cups each having similar first cup rims;
   a plurality of other electrodes supported to rotate with the outer rim electrode of said wheel and each pivotable to a closed position to cause a rim surface thereof to mate with each first cup rim respectively;
   means for directing a pair of superposed webs to lie over the rim electrode when the rim surfaces are spaced apart from the first cup rims;
   cam means for causing said other electrodes to close and compress the webs between rim surfaces and the first cup rims in mating position;
   tunable inductor elements mounted on said wheel in circuit with the mating rims to induce a maximum energy transfer to the webs between the rims; and
   generator means for energizing the circuit formed by said inductor and the mating rims during rotation of said wheel.

9. An apparatus for dielectrically heating a plastic webbing as in claim 8 wherein said inductor elements are each coupled in circuit with one of said other electrodes and each is tunable by driving a threaded plug thereinto, the tuned frequency matching that of said generator means and being determined by the effective inductance and capacitance of the inductor and the mating cup rims with the tuned frequency being of the order of 30 megacycles.

10. An apparatus for dielectrically heating a plastic as in claim 8 including:
    means for rotating said wheel to drive said other electrodes therewith;
    cam means for pivoting said other electrodes to mate with each of the first cup rims respectively during a major portion of the rotation of said wheel; and
    means for evacuating the cup rims to facilitate compression of the webs thereinto while the plastic is being dielectrically heated to a temperature which will weld surfaces thereof together.

11. An apparatus for dielectrically heating a plastic as called for in claim 8 wherein said cam means includes a cam system for opening the mating rim surfaces to allow insertion of the web therebetween and closing same and another cam system for developing compression between the mating rim surfaces during application of dielectric energy thereto.

References Cited

UNITED STATES PATENTS

| | | | |
|---|---|---|---|
| 2,589,400 | 3/1952 | Koster et al. | 219—10.71 X |
| 2,920,173 | 1/1960 | Wästberg | 219—10.53 |
| 3,181,989 | 5/1965 | Melanson et al. | 219—10.53 X |

FOREIGN PATENTS 971,064  11/1958  Germany.

RICHARD M. WOOD, *Primary Examiner.*

L. H. BENDER, *Assistant Examiner.*

U.S. Cl. X.R.

154—380

UNITED STATES PATENT OFFICE

CERTIFICATE OF CORRECTION

Patent No. 3,431,380                                                  March 4, 1969

Robert C. Sutliff et al.

It is certified that error appears in the above identified patent and that said Letters Patent are hereby corrected as shown below:

Column 3, line 25, "to" should read -- by --; line 36, "lug" should read plug --; line 44, "46" should read -- 47 --. Column 5, line 31, "turnable" should read -- tunable --.

Signed and sealed this 31st day of March 1970.

(SEAL)
Attest:

Edward M. Fletcher, Jr.                                WILLIAM E. SCHUYLER, JR.
Attesting Officer                                             Commissioner of Patents